US012568949B2

(12) United States Patent
Wright

(10) Patent No.: US 12,568,949 B2
(45) Date of Patent: Mar. 10, 2026

(54) METHOD AND APPARATUS FOR DEPLOYING, ACTUATING AND RETRIEVING A PESTICIDE CANISTER

(71) Applicant: David Walter Wright, Boyne City, MI (US)

(72) Inventor: David Walter Wright, Boyne City, MI (US)

( * ) Notice: Subject to any disclaimer, the term of this patent is extended or adjusted under 35 U.S.C. 154(b) by 0 days.

(21) Appl. No.: 18/999,510

(22) Filed: Dec. 23, 2024

(65) Prior Publication Data

US 2025/0204511 A1     Jun. 26, 2025

Related U.S. Application Data

(60) Provisional application No. 63/614,164, filed on Dec. 22, 2023.

(51) Int. Cl.
A01M 13/00          (2006.01)
A01M 1/20           (2006.01)
(52) U.S. Cl.
CPC .......... A01M 13/00 (2013.01); A01M 1/2038 (2013.01)
(58) Field of Classification Search
CPC .. A01M 13/00; A01M 13/003; A01M 1/2038; B65D 83/141; B65D 83/166
See application file for complete search history.

(56) References Cited

U.S. PATENT DOCUMENTS

| | | | | |
|---|---|---|---|---|
| 3,013,699 A | * | 12/1961 | Meuwly ............... | B65D 83/184 |
| | | | | 222/394 |
| 7,252,210 B1 | * | 8/2007 | Schultz ............... | B65D 83/184 |
| | | | | 222/174 |
| 8,444,020 B1 | * | 5/2013 | Kenny ................. | B65D 83/184 |
| | | | | 222/402.15 |
| 10,588,308 B1 | * | 3/2020 | Davis .................. | A01M 1/2038 |

* cited by examiner

*Primary Examiner* — Richard G Davis
(74) *Attorney, Agent, or Firm* — John D. Wright; Dickinson Wright PLLC

(57)          ABSTRACT

A pesticide canister assembly includes a canister housing configured to receive a canister containing a pesticide, an actuator fixed to the canister housing, and a retrieval string coupled to the actuator. The actuator is configured for selective movement from a non-actuated position, whereat the canister is not activated to dispense the pesticide, to an actuated position, whereat the canister is activated to dispense the pesticide. The retrieval string is coupled to the actuator, wherein the retrieval string is configured to selectively move the actuator from the non-actuated position to the actuated position, and wherein the retrieval string is configured to retrieve the canister housing.

15 Claims, 7 Drawing Sheets

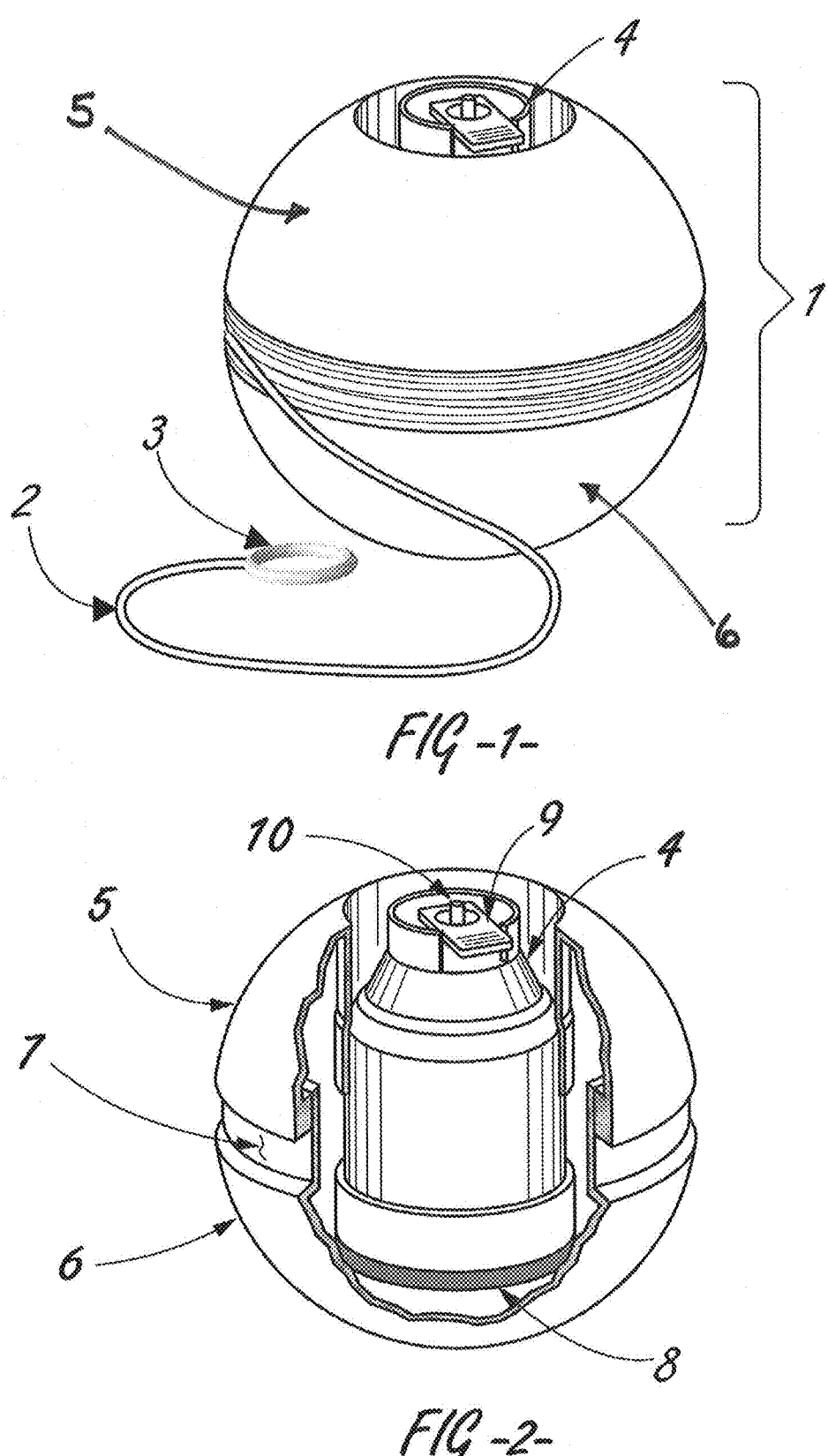
FIG -1-
FIG -2-

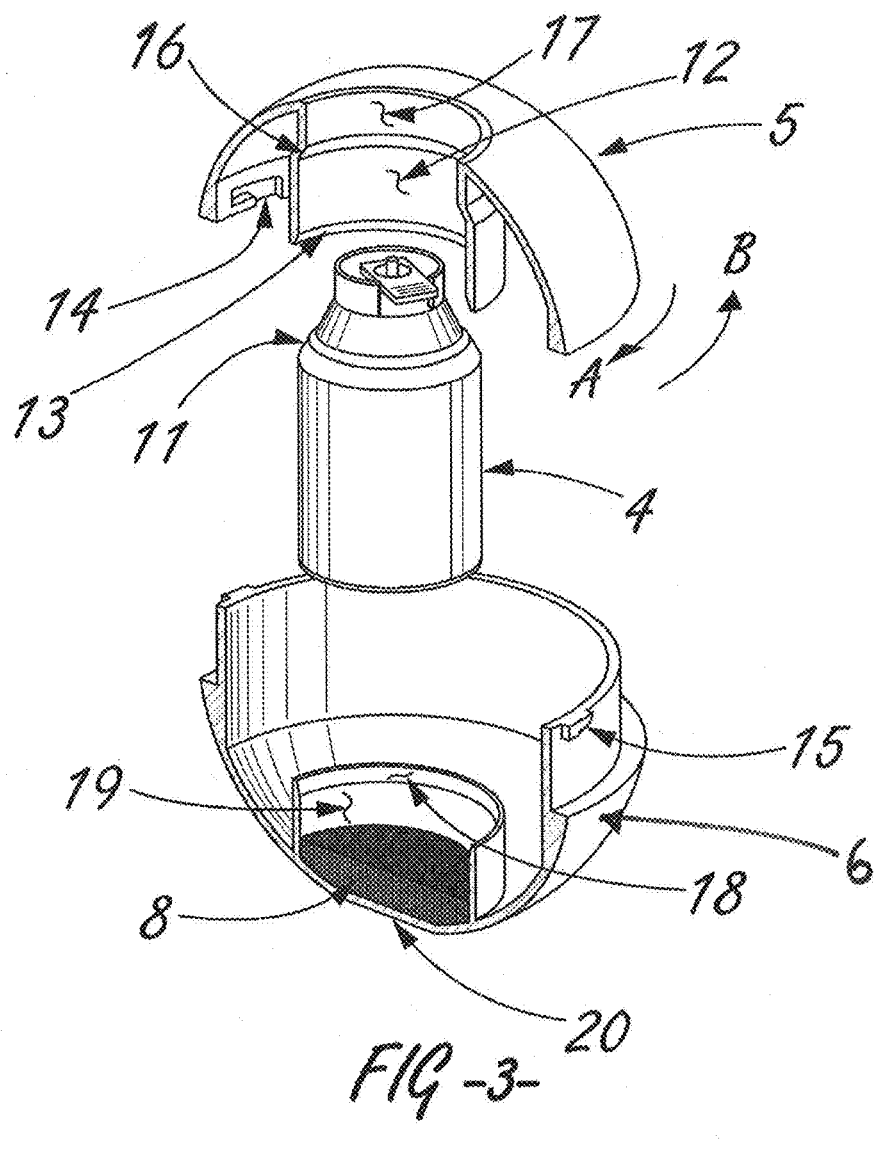
FIG -3-
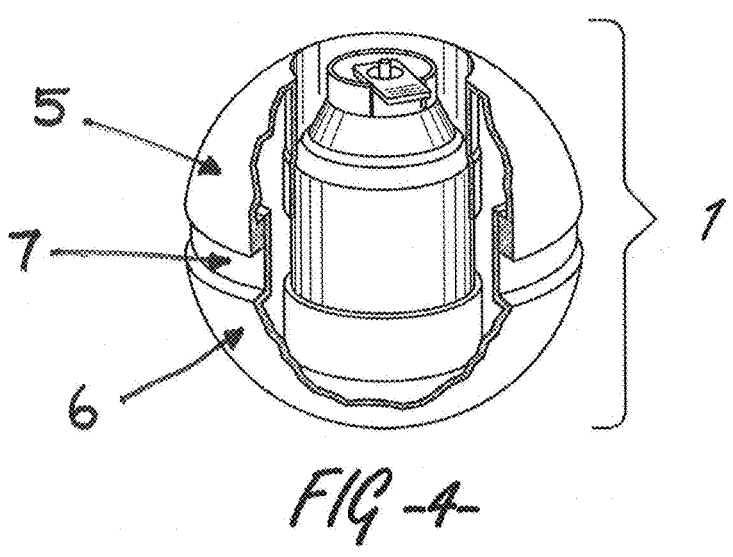
FIG -4-

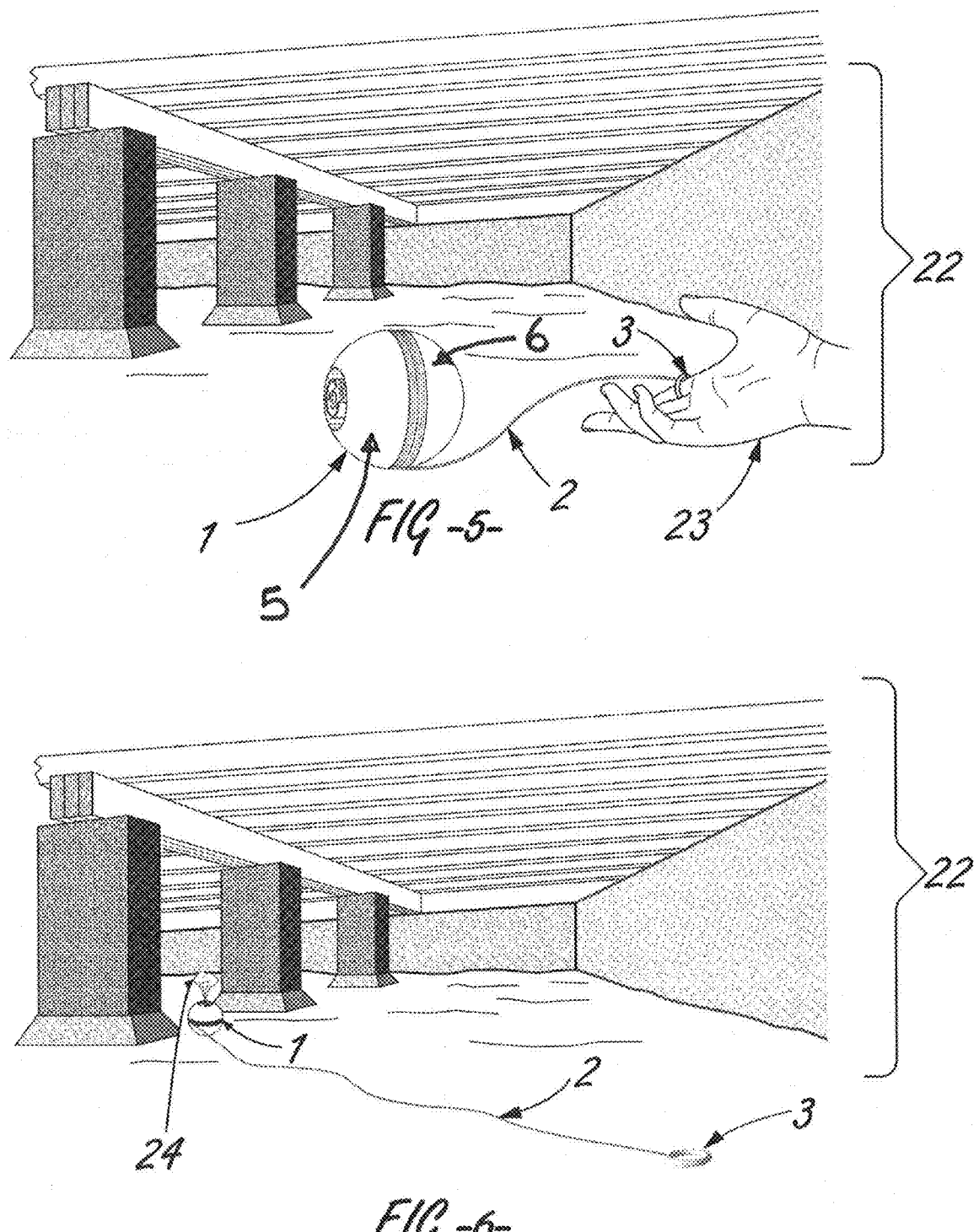
FIG -5-
FIG -6-

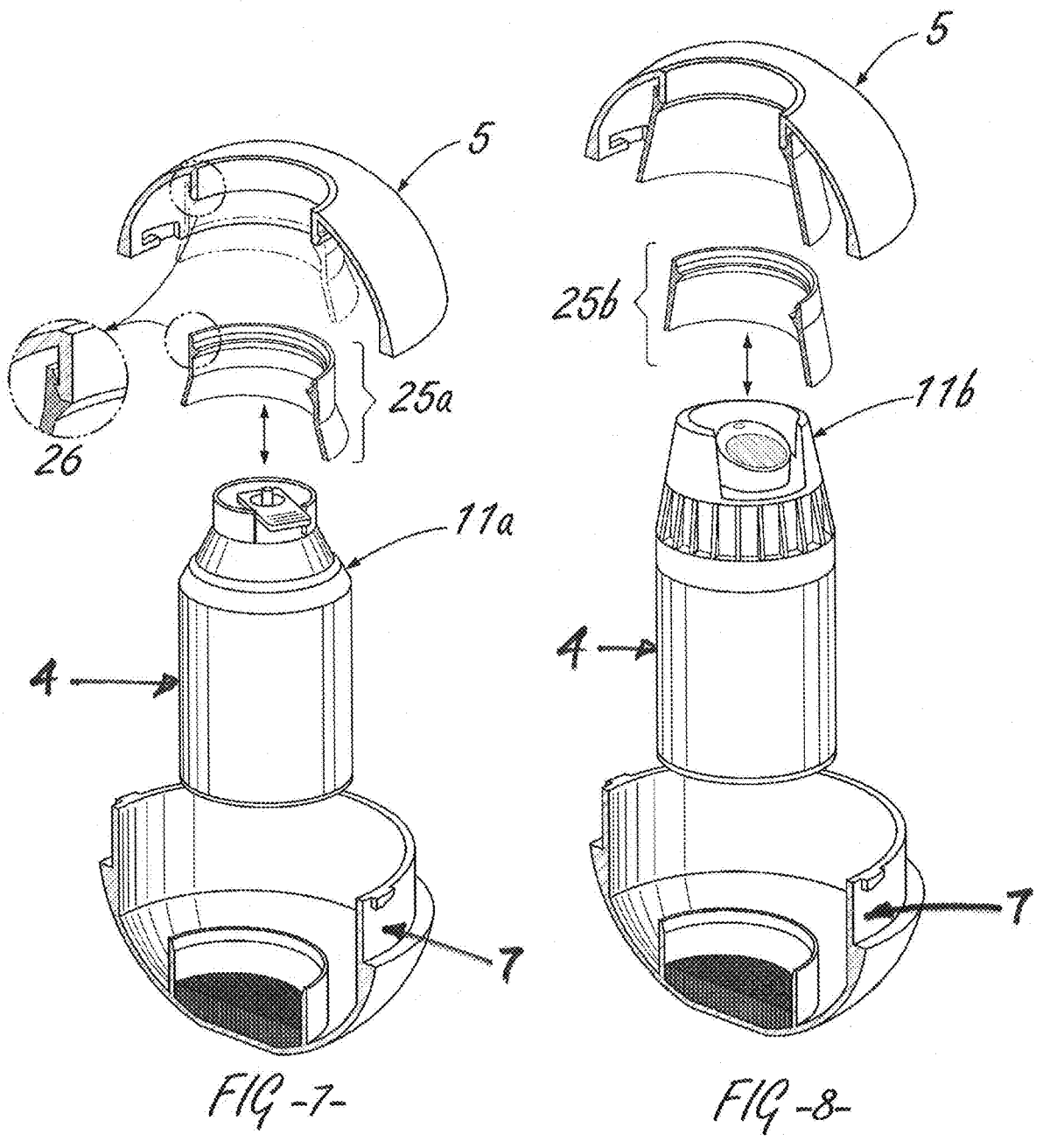
*FIG -7-*               *FIG -8-*

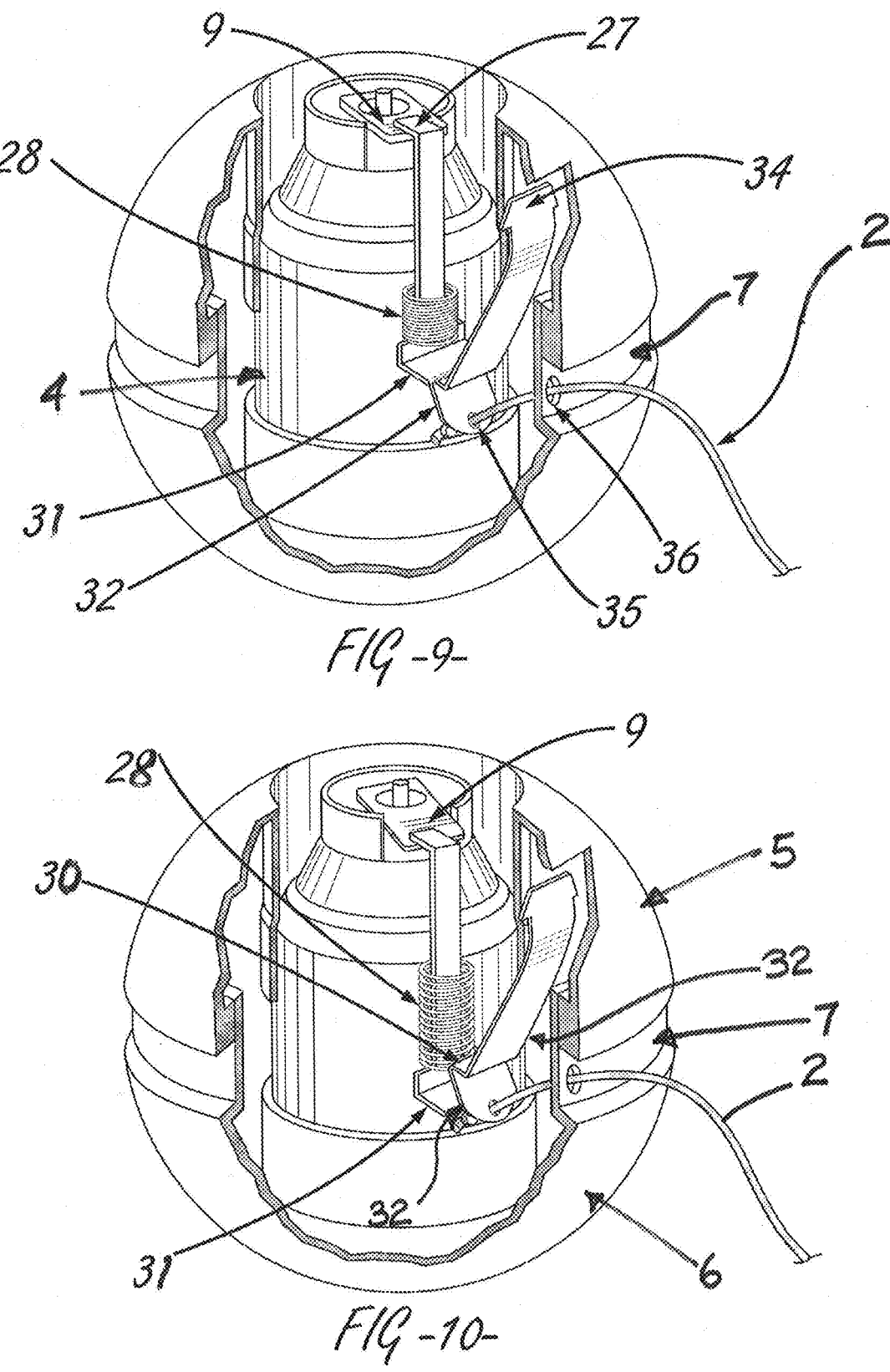
FIG -9-
FIG -10-

METHOD AND APPARATUS FOR DEPLOYING, ACTUATING AND RETRIEVING A PESTICIDE CANISTER

CROSS-REFERENCE TO RELATED APPLICATION

This application claims the benefit of U.S. Provisional Application Ser. No. 63/614,164, filed Dec. 22, 2023, which is incorporated herein by reference in its entirety.

BACKGROUND

1. Field of the Invention

The invention relates generally to apparatus and methods for dispensing a pesticide, and more particularly to apparatus and methods for placement, actuation, and retrieval of a pesticide dispensing device to minimize exposure to the pesticide being dispensed and to facilitate positioning the pesticide dispensing device.

2. Related Art

Pest control, for example, whether insects, rodents, or otherwise, often requires dispensing contents, such as a pesticide, from a container, typically an aerosol container actuated by hand by depressing a spray nozzle with a finger. Although the emitted contents can be effective at controlling the pest, it can be difficult to access the desire area to be treated, such as a crawl space or other tight confine, for example. Additionally, even if the area to be treated is accessible, being directly exposed to the contents being emitted from the container can be a health hazard.

Accordingly, it is desired to have a mechanism that allows a pesticide to be easily dispensed in a desire location, while at the same time minimizing exposure to the pesticide. It is also desired to be able to easily retrieve the container used to dispense the pesticide.

SUMMARY

This section provides a general summary of the present disclosure and is not a comprehensive disclosure of its full scope or all of its features, aspects and objectives.

In accordance with one aspect of the disclosure, a fogging canister deployment, actuation, and retrieval apparatus, also referred to as pesticide canister assembly, is provided. The pesticide canister assembly includes a canister housing configured to receive a canister containing a pesticide. Further, an actuator is fixed to the canister housing, wherein the actuator is configured for selective movement from a non-actuated position, whereat the canister is not activated to dispense the pesticide, to an actuated position, whereat the canister is activated to dispense the pesticide. Further yet, a retrieval string is coupled to the actuator, wherein the retrieval string is configured to selectively move the actuator from the non-actuated position to the actuated position, and wherein the retrieval string is configured to retrieve the canister housing.

In accordance with another aspect of the disclosure, the canister housing has a center of gravity causing the fogging canister housing to come to rest in a predetermined upright orientation, whereat the canister can emit a pesticide medium in an unobstructed fashion from the canister.

In accordance with another aspect of the disclosure, the housing is generally spherical.

In accordance with another aspect of the disclosure, the housing has a flat surface on which the housing rests when in the predetermined upright orientation.

In accordance with another aspect of the disclosure, the housing has an upper portion and a lower portion, the upper portion forming a first part of the canister housing and the lower portion forming a second part of the canister housing.

In accordance with another aspect of the disclosure, the housing is configured to accommodate a plurality of canister sizes and configurations.

In accordance with another aspect of the disclosure, the actuator is configured to activate an aerosol canister.

In accordance with another aspect of the disclosure, the actuator is biased to move toward the actuated position by a spring.

In accordance with another aspect of the disclosure, the actuator includes a pawl configured to retain the spring in a compressed state, whereat the actuator is in the non-actuated position, and wherein the pawl is configured to release the spring to allow the spring to move to an uncompressed state, whereat the actuator is in the actuated position.

In accordance with another aspect of the disclosure, a method of dispensing a pesticide from a canister is provided. The method includes providing a canister housing; disposing the canister containing a pesticide in the canister housing; locating the canister housing in an area to be exterminated; activating the canister from an area remote from the area to be exterminated and causing the pesticide to be dispensed from the container; and retrieving the canister housing from an area remote from the area to be exterminated.

In accordance with another aspect of the disclosure, the method further includes activating the canister by pulling on a string attached to an actuator of the canister housing.

In accordance with another aspect of the disclosure, the method further includes retrieving the canister housing by pulling on the string.

In accordance with another aspect of the disclosure, the method further includes pulling a pawl out from locked engagement with an actuator and causing the actuator to be automatically biased from a non-actuated position to an actuated position to cause the pesticide to be dispensed from the container.

In accordance with another aspect of the disclosure, the method further includes biasing the actuation from the non-actuated position to the activated position with a spring.

In accordance with another aspect of the disclosure, the method further includes locating the canister housing in the area to be exterminated by tossing the canister housing from the area remote from the area to be exterminated to the area to be exterminated.

In accordance with another aspect of the disclosure, the method further includes causing the string to unwrap from the canister housing as the canister housing is moving from the area remote from the area to be exterminated to the area to be exterminated.

In accordance with another aspect of the disclosure, the method further includes causing the string to unwrap from an annular recessed groove in the canister housing as the canister housing is moving from the area remote from the area to be exterminated to the area to be exterminated.

BRIEF DESCRIPTION OF THE DRAWINGS

These and other aspects, features and advantages will become readily apparent to those skilled in the art in view of the following detailed description of presently preferred embodiments and best mode, appended claims, and accompanying drawings, in which:

FIG. 1 is a perspective view of a fogging ball assembly constructed in accordance with the invention;

FIG. 2 is a cross-sectional view of the fogging ball assembly illustrating a canister contained therein;

FIG. 3 is an exploded view of the cross-section of FIG. 2;

FIG. 4 is a partial cut-away view of the fogging fall assembly with canister;

FIG. 5 illustrates a deployment of the fogging ball with canister in a crawlspace depicting a grasping retainer on a hand of user;

FIG. 6 illustrates the fogging ball and canister in a deployed position with retrieval string and grasping retainer positioned for easy grasping by the user;

FIG. 7 is an exploded view of the fogging fall assembly with a first embodiment of a canister interface receiver "a" in accordance with one aspect of the disclosure;

FIG. 8 is an exploded view of the fogging fall assembly with a second embodiment of a canister interface receiver "b" in accordance with another aspect of the disclosure;

FIG. 9 is a partial cutaway view of the fogging ball assembly illustrating a trigger actuator in a non-actuated, cocked position;

FIG. 10 is a view similar to FIG. 9 with the trigger actuator in a released, actuated position;

DETAILED DESCRIPTION

Figures 11, 12:
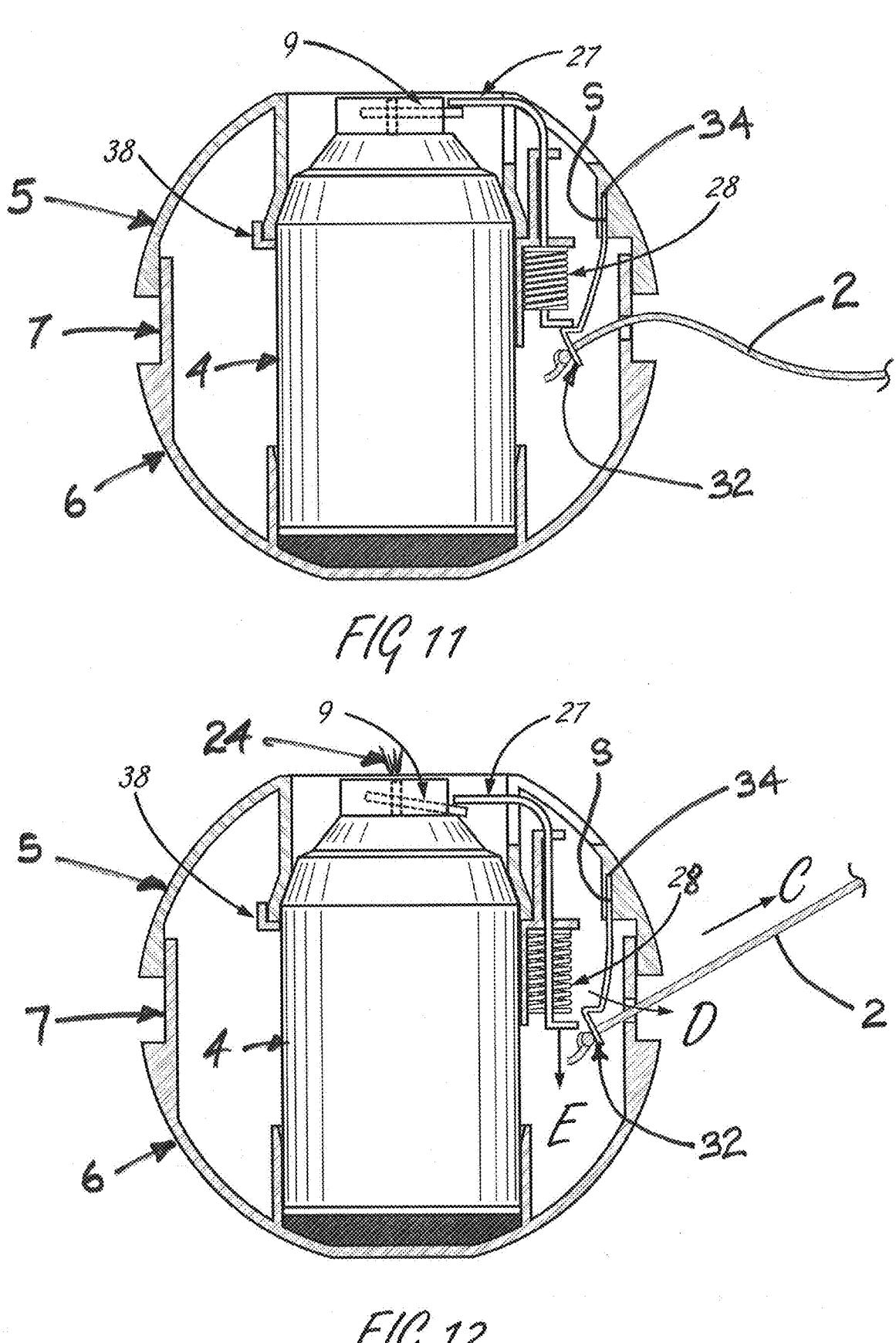
FIG. 11 is a cross-sectional view of the fogging ball assembly with the trigger actuator in the non-actuated, cocked position.
FIG. 12 is a cross-sectional view of the fogging ball assembly with the trigger actuator in the released, actuated position.

A series of example embodiments of an apparatus for deploying, actuating, and retrieving a pesticide canister will now be described more fully with reference to the accompanying drawings. To this end, the example embodiments of the apparatus is provided so that this disclosure will be thorough, and will fully convey its intended scope to those who are skilled in the art. Accordingly, numerous specific details are set forth such as examples of specific components, devices, and methods, to provide a thorough understanding of a particular embodiment of the present disclosure. However, it will be apparent to those skilled in the art that specific details need not be employed, that the example embodiments may be embodied in many different forms, and that the example embodiments should not be construed to limit the scope of the present disclosure. In some parts of the example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

Referring in more detail to the drawings, FIG. 1 illustrates a pesticide canister deployment, actuation, and retrieval apparatus, referred to hereafter as pesticide canister assembly or pesticide assembly 1, constructed in accordance with one non-limiting aspect of the disclosure. The pesticide assembly 1 includes a canister housing, shown in a non-limiting embodiment including a first half 5 and a second half 6, with a canister 4 having a pesticide contained therein disposed in the canister housing. A retrieval string 2 is disposed through a retrieval string port 36 of the canister housing, with retrieval string port 36 shown being formed in the second half 6 (FIGS. 9-12), with one end of the retrieval string 2 having an attached grasping retainer, shown by way of example and without limitation as a finger ring 3, sized to be disposed on a finger of a user, and an opposite end operably coupled to an actuator, such as an actuator, also referred to as actuator lever 32, of the canister 4 (FIGS. 9-13).

FIG. 2 depicts a cut-away of the pesticide assembly 1 with the canister 4 having an actuator, shown by way of example and without limitation as an actuation button, also referred to as actuation trigger 9, and a dispenser nozzle, such as a spray nozzle 10 often found on aerosol cans of readily available pesticide spray cans. Canister 4 is contained within and trapped between the first half, also referred to as upper half 5 of the canister housing of the pesticide assembly 1, and the second half, also referred to as lower half 6 of the canister housing (5+6, referred to hereafter as 5, 6). Accordingly, the upper portion 5 forms a first part of the canister housing and the lower portion 6 forms a second part of the canister housing. The upper and lower halves 5, 6 can be joined by suitable joining mechanism, such as a selectively releasable bayonet lock mechanism, by way of example and without limitation. The selectively releasable bayonet lock mechanism is provided in part by the upper half 5 having a female bayonet pawl receiver 14 and in part by the lower half 6 having a male bayonet pawl 15, with the female and male components 14, 15 interfacing with one another to releasably lock the halves 5, 6 together. The assembly 1 can be further locked to prevent separation of the halves 5, 6 from one another by a rotational motion of the upper half 5 in a first direction A, and then selectively unlocked by an opposite rotational motion of the upper half 5 in an opposite second direction B (FIG. 3). FIG. 4 depicts the pesticide assembly 1, including the housing with the fogging canister 4 fully assembled within the housing.

The lower half 6, by way of example and without limitation, has an annular external retrieval string journal formed as an annular recessed groove 7 for wrapped disposal of the retrieval string 2 thereabout. With the retrieval string journal 7 being formed as a recessed groove, upon wrapping the retrieval string 2 thereabout, the retrieval string 2 remains generally flush with an outer surface of the first and second portions 5, 6, thereby facilitating deployment of the pesticide assembly 1 during use. In the exemplary non-limiting embodiment illustrated, the upper half 5 is semispherical and the lower half 6 is semispherical, and thus, when releasably fixed to one another, the housing has a spherical outer contour to allow the pesticide assembly 1 to roll to the intended location prior to actuating the canister 4. The retrieval string port 36 is formed through the journal 7. A self-righting counter weight 8 is provided in the housing, shown as being located toward a bottom surface of the lower portion 6, such that the self-righting counter weight 8 causes the pesticide assembly 1 to right itself, also referred to as self-right, such that the spray nozzle 10 remains oriented in an a predetermined upward orientation upon the pesticide assembly 1 being in a stationary, rest position on a generally flat surface.

FIG. 3 depicts some of the detailed attributes of the pesticide assembly 1 with the canister 4 positioned to be contained between the upper half 5 and the lower half 6 of the housing of the pesticide assembly 1. An upper portion of the canister 4 is received in an upper canister receiving receptacle, also referred to as sleeve 12, of the upper half 5 of the canister housing, wherein disposal of the upper portion of the canister 4 in the sleeve 12 can be facilitated by an upper canister loading chamfer 13. The canister 4 placement is restricted axially by the interface of a canister shoulder 11 on the canister 4 and a canister retaining chamfer 16 on the upper half 5 of the canister housing. A lower portion of the canister 4 is received in a lower canister receiving receptacle, also referred to sleeve 19 of the lower half 6 of the canister housing, with the lower canister receiving sleeve 19 having a loading chamfer 18 to facilitate disposing the lower portion of the canister 4 in the sleeve 19. The self-righting weight 8 is shown located on a base of the lower canister receiving sleeve 19 beneath the canister 4, thereby shifting a center of gravity of the pesticide assembly 1 to adjacent the base of the lower housing 6, thereby causing the pesticide assembly 1 to automatically orient itself in an orientation with the spray nozzle 10 pointing upwardly for unobstructed dispensing of the pesticide from the spray nozzle 10. The lower half 6 can further include a self-righting surface, preferably a planar, flat surface 20, further facilitating, in combination with the self-righting weight 8, a self-righted stationary stability of the pesticide assembly 1 with the flat surface resting on a ground surface.

When the pesticide assembly 1 is resting on the flat surface 20, the pesticide assembly 1 is in its predetermined (planned and intended) stationary orientation, whereat the canister nozzle 10 is pointing upwardly for unobstructed dispensing of a pesticide medium contained with the fogging canister 4 upon being deployed in use. The pesticide medium can be any desired medium, such as a medium intended to be sprayed in a fogging manner from the nozzle 10, and any desired type of pesticide, depending on the type of pest being targeted.

FIG. 5 depicts the pesticide assembly 1 being deployed by a user's hand 23 tossing the pesticide assembly 1 in a typical crawl space 22 to an area to be exterminated, by way of example and without limitation. During deployment, the retrieval string finger ring 3 can be disposed on the user's finger, with the retrieval string 2 extending between and fixed to the ring 3 and the actuator lever 32 of the assembly 1. During deployment, a sprayed fogging plume 24 of the pesticide medium is dispensed from the spray nozzle 10 of the canister 4, wherein the canister 4 can be provided as an aerosol canister 4 with the pesticide being contained under pressure, such as can be initiated via selective actuation of an actuator 27 via string 2, as discussed further below.

FIG. 6 depicts the housing 5, 6 of the pesticide assembly 1 with the canister 4 therein having been deployed to the desired location, with the canister 4 activated with within the crawlspace 22, with the retrieval string 2 unwound from the retrieval string journal 7 of the pesticide assembly 1, and the retrieval string finger ring 3 laying at rest where the user intentionally set the ring 3 after activation of the canister 4. At any time thereafter, preferably after the pesticide has been dispensed within the crawlspace 22, the user can readily grasp the ring 3, when desired, to retrieve the assembly 1 from its deployed position.

FIGS. 7 and 8 depict two different non-limiting configurations of canisters having different canister shoulders 11a, 11b and different non-limiting canister receivers 25a, 25b removably affixed by a snap-fit 26 or other attachment mechanism. Accordingly, the canister housing 5, 6 is configured to accommodate differing canister configurations.

FIGS. 9 and 10 depict one embodiment of a trigger actuator of the actuator 27 in both the non-actuated, cocked position (FIG. 9) and the actuated, released position (FIG. 10). The actuation of actuator 27 is caused by an intended tension acting on actuator 27 via string 2. In particular, a suitable force can be applied via a slight tug of string 2 by the user, when desired, after disposing the canister housing in the desired location, by pulling on the string 2. Ideally, the tug can be imparted by the string 2 being tensioned upon being fully unwound from the retrieval string journal 7. Accordingly, the user is remote (distanced from the canister 4 by the length of the string 2) from the canister 4, thereby avoiding being in the area of the pesticide as the pesticide is being dispensed from the canister 4.

7

8

Figure 13:
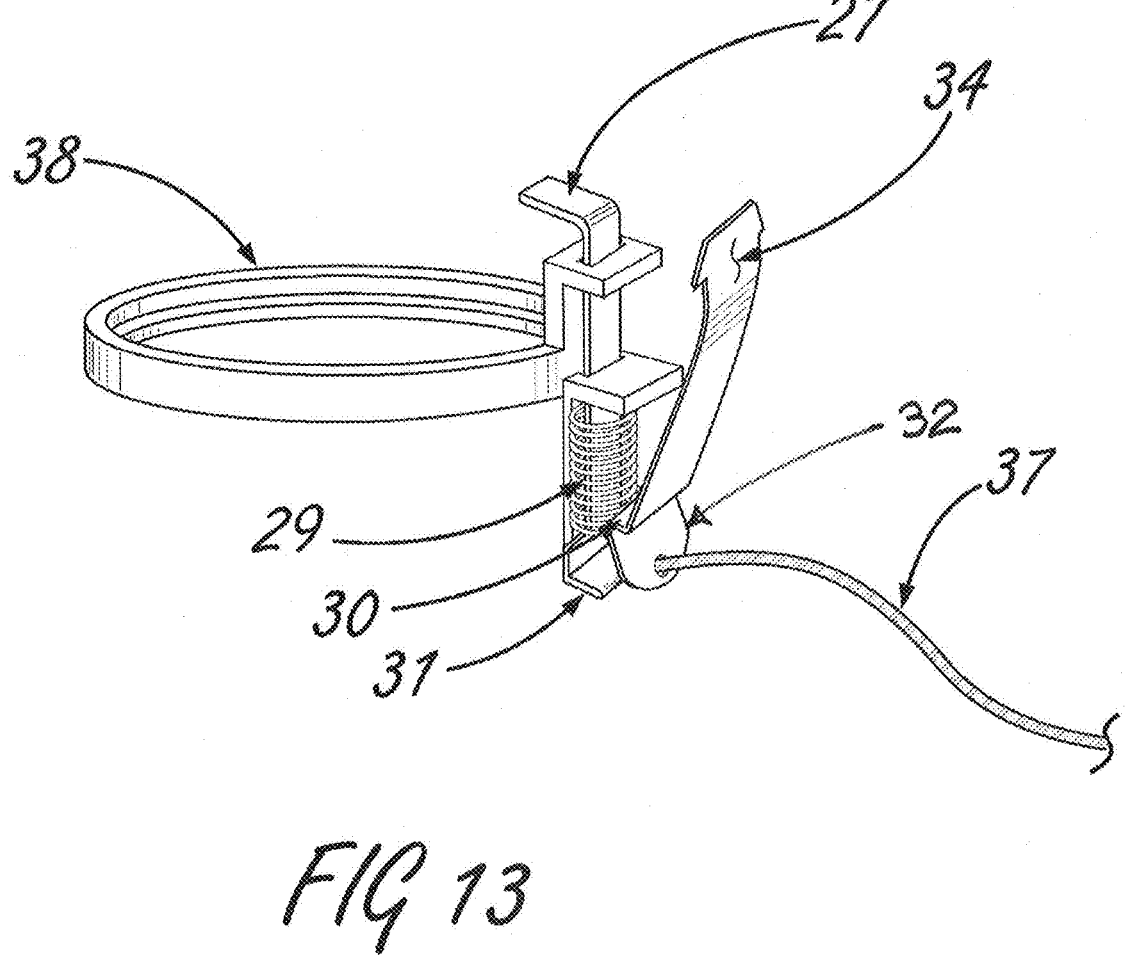
FIG. 13 is a perspective view of an actuator frame illustrated while in a released, actuated state for clarity.

FIGS. 11 and 12 depict the same embodiment as FIGS. 9 and 10 in a cross-sectional view, for clarity purposes, and demonstrate the motions of actuation of actuator 27 moving from the non-actuated position (FIG. 11) to the actuated position (FIG. 12), as follows. Arrow "C" indicates the direction of tension force and motion exerted by the retrieval string 2 on the actuator lever 32, also referred to as escapement lever. String 2 can be fixed to actuator lever 32 as desired, and is shown, by way of example and without limitation, as being disposed through a retrieval string receiver opening 35 (FIG. 9) formed through actuator lever 32, with string 2 being prevented from being pulled through opening 35, such as via an oversized knot formed in string 2 or a ferrule fixed adjacent an end of string 2. Arrow "D" indicates the resulting moment (force) and direction of movement the escapement lever 32 in pivoting movement relative to a fixed escapement lever mount portion 34 of escapement lever 32. The escapement lever mount portion 34 can be fixed to the upper housing 5, as desired, and is shown disposed and fixed in a cavity or slot S of upper housing 5, by way of example and without limitation. During pivoting movement of escapement lever 32, an actuator pawl 30 of escapement lever 32 is moved out from locking engagement with an escapement lock portion, also referred to as escapement receiver 31 (FIG. 13). Arrow "E" indicates the direction of movement of the actuator 27 toward the actuated position upon release of escapement receiver 31 from captured engagement by actuator pawl 30, due to the force imparted on the actuator 27 by an actuator spring 28, wherein spring 28 is shown in a compressed state in FIGS. 9 and 11, prior to actuation of actuator 27, and extended to an uncompressed state in FIGS. 10 and 12, upon release or actuation of actuator 27. Upon spring 28 moving the uncompressed state, actuator 27 activates release of the pesticide from canister 4, wherein canister 4 can be an aerosol canister containing the pesticide under pressure, and wherein actuator 27 depresses the spray nozzle 10 to spray the pesticide in the vaporized fog plume 24 until all the pesticide has been released from canister 4.

Upon completing use of pesticide assembly 1, and upon retrieval of pesticide assembly 1 via retrieval string 2, the used canister 4 can be removed by selectively separating the housing halves 5, 6 from one another, and a new, unused canister 4 can be disposed within the canister housing for continued use of pesticide assembly 1.

In accordance with another aspect of the disclosure, a method of dispensing a pesticide from a canister 4 is provided. The method includes providing a canister housing 5, 6; disposing the canister 4 containing a pesticide in the canister housing 5, 6; locating the canister housing 5, 6 in an area to be exterminated; activating the canister 4 from an area remote from the area to be exterminated and causing the pesticide 24 to be dispensed from the container 4; and retrieving the canister housing 5, 6 from an area remote from the area to be exterminated.

In accordance with another aspect of the disclosure, the method further includes activating the canister 4 by pulling on a string 2 attached to an actuator 9 of the canister housing 5, 6.

In accordance with another aspect of the disclosure, the method further includes retrieving the canister housing 5, 6 by pulling on the string 2.

In accordance with another aspect of the disclosure, the method further includes pulling a pawl 30 out from locked engagement with an actuator 27 and causing the actuator 27 to be automatically biased from a non-actuated position to an actuated position to cause the pesticide to be dispensed from the container 4.

In accordance with another aspect of the disclosure, the method further includes biasing the actuation 27 from the non-actuated position to the activated position with a spring 28.

In accordance with another aspect of the disclosure, the method further includes locating the canister housing 5, 6 in the area to be exterminated by tossing the canister housing 5, 6 from the area remote from the area to be exterminated to the area to be exterminated.

In accordance with another aspect of the disclosure, the method further includes causing the string 2 to unwrap from the canister housing 5, 6 as the canister housing 5, 6 is moving from the area remote from the area to be exterminated to the area to be exterminated.

In accordance with another aspect of the disclosure, the method further includes causing the string 2 to unwrap from an annular recessed groove 7 in the canister housing 5, 6 as the canister housing 5, 6 is moving from the area remote from the area to be exterminated to the area to be exterminated.

Obviously, many modifications and variations of the present invention are possible in light of the above teachings. It is contemplated that all features of all claims and of all embodiments can be combined with each other, so long as such combinations would not contradict one another. It is, therefore, to be understood that within the scope of the appended claims, the invention may be practiced otherwise than as specifically described.

What is claimed is:

1. A pesticide canister assembly, comprising:
   a canister housing configured to receive a canister containing a pesticide;
   an actuator fixed to the canister housing, the actuator configured for selective movement from a non-actuated position, whereat the canister is not activated to dispense the pesticide, to an actuated position, whereat the canister is activated to dispense the pesticide; and
   a retrieval string coupled to the actuator, wherein the retrieval string is configured to selectively move the actuator from the non-actuated position to the actuated position, and wherein the retrieval string is configured to retrieve the canister housing.

2. The apparatus of claim 1, wherein the canister housing has a center of gravity causing the fogging canister housing to come to rest in a predetermined orientation, whereat the canister can emit a pesticide medium in an unobstructed fashion from the canister.

3. The apparatus of claim 2, wherein the housing is generally spherical.

4. The apparatus of claim 3, wherein the housing has a flat surface on which the housing rests when in the predetermined orientation.

5. The apparatus of claim 1, wherein the housing has an upper portion and a lower portion, the upper portion forming a first part of the canister housing and the lower portion forming a second part of the canister housing.

6. The apparatus of claim 1, wherein the housing is configured to accommodate a plurality of canister configurations.

7. The apparatus of claim 1, wherein the actuator is configured to activate an aerosol canister.

8. The apparatus of claim 1, wherein the actuator is biased to move toward the actuated position by a spring.

9. The apparatus of claim 8, wherein the actuator includes a pawl configured to retain the spring in a compressed state, whereat the actuator is in the non-actuated position, and wherein the pawl is configured to release the spring to allow the spring to move to an uncompressed state, whereat the actuator is in the actuated position.

10. A method of dispensing a pesticide from a canister, comprising:

providing a canister housing;

disposing the canister containing a pesticide in the canister housing;

locating the canister housing in an area to be exterminated;

activating the canister from an area remote from the area to be exterminated and causing the pesticide to be dispensed from the container;

retrieving the canister housing from an area remote from the area to be exterminated;

activating the canister by pulling on a string attached to an actuator of the canister housing; and retrieving the canister housing by pulling on the string.

11. The method of claim 10, further including pulling a pawl out from locked engagement with an actuator and causing the actuator to be automatically biased from a non-actuated position to an actuated position to cause the pesticide to be dispensed from the container.

12. The method of claim 11, further including biasing the actuation from the non-actuated position to the activated position with a spring.

13. The method of claim 10, further including locating the canister housing in the area to be exterminated by tossing the canister housing from the area remote from the area to be exterminated to the area to be exterminated.

14. The method of claim 13, further including causing the string to unwrap from the canister housing as the canister housing is moving from the area remote from the area to be exterminated to the area to be exterminated.

15. The method of claim 13, further including causing the string to unwrap from an annular recessed groove in the canister housing as the canister housing is moving from the area remote from the area to be exterminated to the area to be exterminated.

* * * * *